United States Patent [19]

Borzym

[11] 4,055,100
[45] Oct. 25, 1977

[54] SEVERING KNIFE FOR TUBE CUTOFF APPARATUS

[75] Inventor: Alexander Borzym, Dearborn, Mich.

[73] Assignee: Alpha Industries, Inc., Detroit, Mich.

[21] Appl. No.: 704,420

[22] Filed: July 12, 1976

[51] Int. Cl.² ............................................. B26D 5/42
[52] U.S. Cl. .......................................... 83/454; 83/54; 83/319; 83/384
[58] Field of Search ................. 83/454, 455, 456, 382, 83/466, 466.1, 54, 319, 383, 384

[56] References Cited

U.S. PATENT DOCUMENTS

| 288,339 | 11/1883 | Jenkins | 83/454 |
| 3,938,415 | 2/1976 | Borzym | 83/385 |

Primary Examiner—Willie G. Abercrombie
Attorney, Agent, or Firm—Krass & Young

[57] ABSTRACT

A tube cutoff apparatus of the shear knife type is provided with an improved knife holder to reduce the likelihood of fracture. The knife holder and the tube clamping jaws are formed to provide a nesting relationship at the full cut position which increases the blade penetration depth without sacrificing blade support.

2 Claims, 4 Drawing Figures

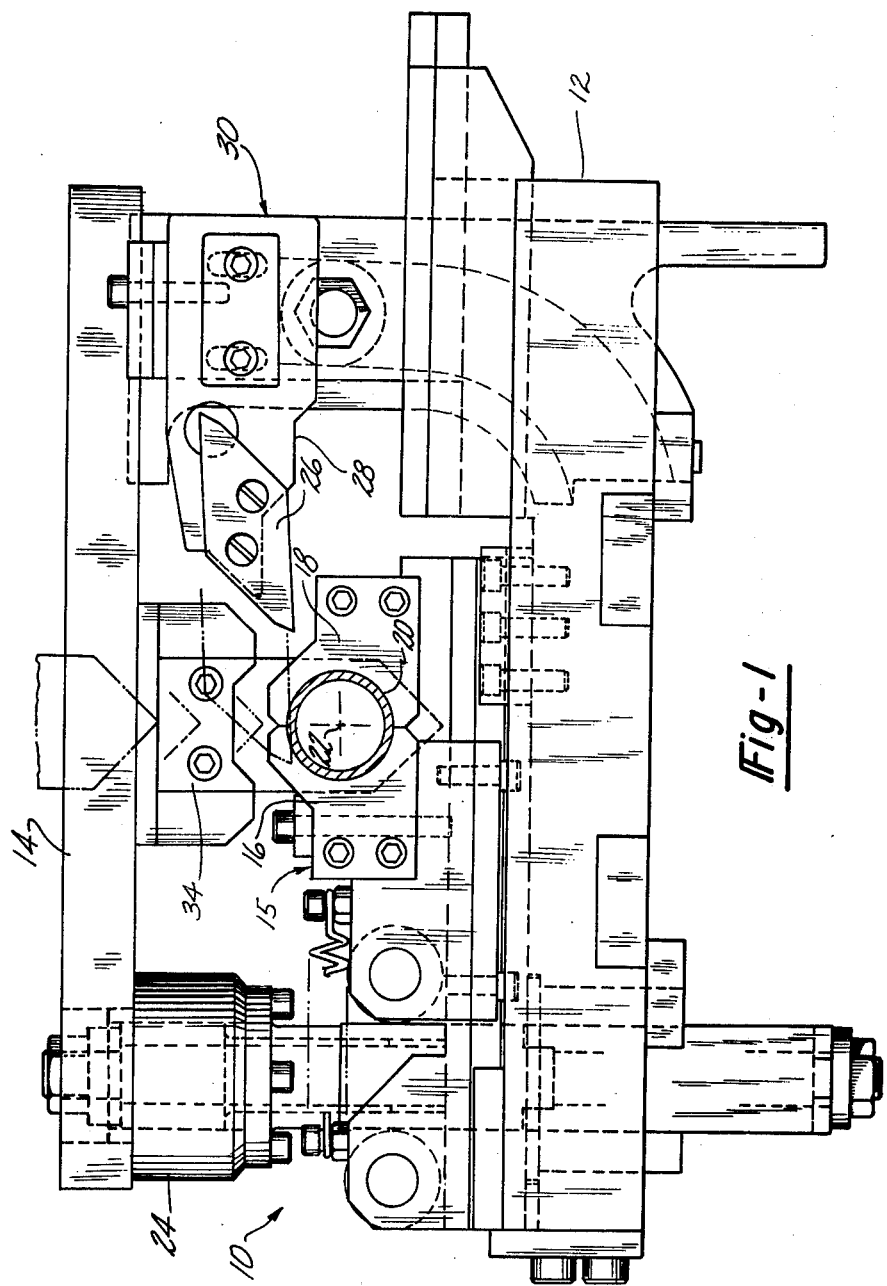

SEVERING KNIFE FOR TUBE CUTOFF APPARATUS

INTRODUCTION

This invention relates to tube cutoff apparatus of the type using a ram-driven shearing knife, and more particularly to a design which increases knife penetration without sacrificing knife support.

BACKGROUND OF THE INVENTION

A well-known way of cutting tubular workpieces into desired lengths is to shear or sever the tubing by a guillotine-type operation. Basically, this involves clamping the tubing between a set of jaws to hold it stationary and driving a knife through the tubing in a plane perpendicular to the longitudinal axis of the tubing and between the jaws. A device of this class is disclosed in U.S. Pat. No. 3,273,433 to Alexander Borzym.

As a practical matter, the stroke length or penetration depth of the cutoff is limited by the point at which the knife holder meets the clamping jaws. It is desirable to maximize stroke length so that the knife edge can be reground several times, each such regrinding having the effect of shortening the knife length available to penetrate the workpiece. On the other hand, penetration depth cannot be gained at the expense of lateral support for the knife since sufficient lateral loading is produced in the typical shearing operation to break off an inadequately supported knife.

BRIEF SUMMARY OF THE INVENTION

The principal object of the invention is to provide a blade or knife holder and clamping jaw combination for reciprocating ram cutoff machins which maximizes shear stroke and blade penetration depth without sacrificing blade support.

In general, this is accomplished by providing a blade clamp structure adapted to be carried by a reciprocating ram, and a clamping jaw set for clamping a workpiece to be cut, the clamp structure having vertically projecting lateral support portions bounding a recessed central area, the lateral portions being spaced apart by slightly less than the blade width thereby to extend down along the length of the blade. The clamping jaws are provided with a top surface, toward which the ram travels, which is configured to mate with the clamp structure at the bottom of the stroke; i.e., the center part of the clamp jaws fit into the recess in the clamp structure whereas the lateral extremities of the tip surface are cut away to receive the downwardly extending lateral projections of the clamp.

In the preferred embodiment, the clamp structure comprises a blade carrier connected to the ram and defining a blade pocket, and a clamp which is bolted to the carrier through the blade. The clamping jaws comprise two reversely similar jaw pairs spaced apart along the workpiece axis to provide clearance for the blade during the cut stroke. It will be apparent that the jaws are intended to be opened and closed to clamp the workpiece only during the shearing operation.

BRIEF DESCRIPTION OF THE DRAWINGS

FIG. 1 is an elevational view of a tube cutoff machine which is representative of the class of apparatus for which the present invention is useful;

DETAILED DESCRIPTION OF THE SPECIFIC EMBODIMENT

Figure 3:
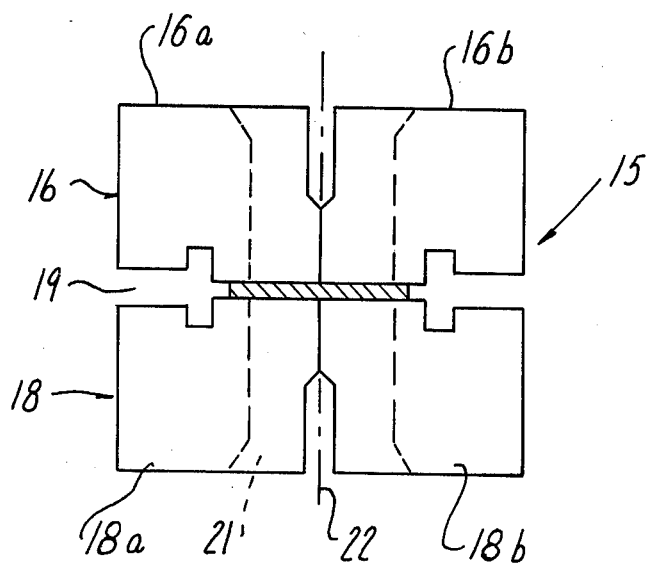
FIG. 3 is a top view of the workpiece clamping means of FIG. 1 illustrating the slot provided for the severing knife blade.

With reference to FIG. 1, a tube cutoff apparatus embodying the present invention is shown generally at 10. The apparatus 10 is a so-called double-cut die set for reciprocating ram presses and is representative of the broad class of cutoff apparatus which use a shear-type severing operation and to which the present invention is adaptable. A more complete description of the die set 10 may be found in the copending application U.S. Ser. No. 426,087 filed Dec. 19, 1973, now U.S. Pat. No. 3,938,415 issued Feb. 17, 1976.

The double cut die set comprises an upper shoe 14 which carries a shearing kknife 34 and which is driven by the reciprocating ram of a press such as the "winging Ram" press available from Alpha Industries of Detroit, Michigan. The upper shoe carries bushings which slide on guide pins held by a lower shoe assembly 12 which is typically mounted on the base of the press. The double cut die set of FIG. 1 further comprises a clamping jaw set 15 to hold a tubular workpiece 20 in place during the shearing operation. The jaw set is opened and closed in timed relation to the movement of the blade 34 as is more fully described in my U.S. Pat. No. 3.938,415. The blade 34 actually descends between the segments of the jaw set 15 as is more fully described with reference to FIGS. 3 and 4, such that the bottom of the shear stroke is defined by the point at which the blade holder meets the top surface of the jaw set 15.

Figure 4:
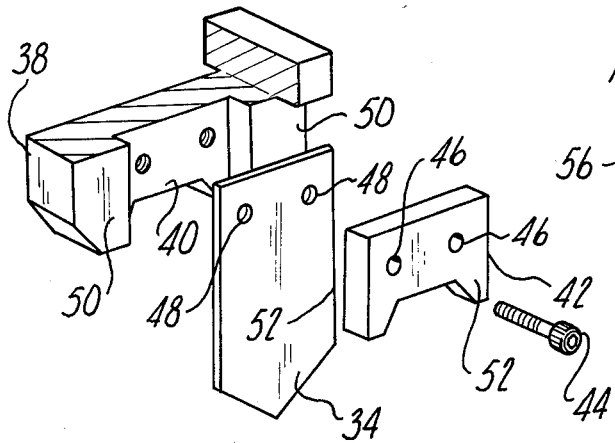
FIG. 4 is a perspective view of the details of the blade holder.

As illustrated in FIGS. 3 and 4, the jaw set 15 includes first and second pairs of die jaws 16 and 18, each of which are spaced from the other along the longitudinal axis 22 of the tubing 20. The spacing between the first and second die jaw pairs 16 and 18 defines a central passage or slot 19 which is to provide clearance for the severing blade, as will be hereinafter described in greater detail.

The die jaw pair 16 is formed of two mirror image die bodies 16a and 16b disposed in opposed lateral positions about longitudinal axis 22. Each die body 16a and 16b has a semicircular opening formed in the face adjacent the other die body to define a substantially round clamping aperture 21 to receive the tubular workpiece 20.

The die jaw pair 18 is reversely similar to die jaw pair 16.

Jaw set 15 is opened during the stage when the tubing is being received from a tube mill or the like but is thereafter closed and remains closed during the shearing operation. The condition of the die jaw set 15 is controlld by a cam and follower assembly, shown generally at 24, which is mechanically programmed to open and close the die jaw pairs 16 and 18 in the sequence heretofore described. The cam assembly 24 is carried by the upper shoe 14 which reciprocates through an upward/downward path once during each cycle. The shoe 14 may, in turn, be driven by any conventional reciprocating power source.

In the double cut apparatus 10, the tubing 20 is notched on its upper periphery preparatory to severing by a notching blade 26 which is supported in a blade holder 28. The blade 26 travels reciprocally through a plane perpendicular to the longitudinal axis 22, and at its left-most extreme of travel intersects with the tubing 20 to form a chordal notch in the tubing. The position of the blade 26 is controlled by a cam and follower assembly, shown generally at 30. The cam and follower assembly 30 is coupled to the blade holder 28 and is mechanically programmed to move the blade 26 toward the tubing 20 during the notching stage. The cam and follower assembly 30 is driven by the shoe 14. The invention is not limited to double cut machines.

The severing operation, which is of particular interest to the present invention, is accomplished by means of an assembly shown generally at 32. Assembly 32 is carried by the shoe 14. The blade holer assembly 32 comprises a carrier 38 having a pocket 40 formed therein to snugly receive the blade 34, and a clamp 42 which is placed over the face of the blade after the blade has been placed within the pocket. Machine screws 44 extend through unthreaded holes 46 and 48 in the clamp and blade respectively and into threaded holes in carrier 38 to hold the assembly together.

The carrier and clamp 42 are configured to provide vertically extending lateral portions 50 and 52, respectively, which bound a central recess in each member. The portions 50 and 52 are spaced by just less than the width of blade 34 such that the sides of the blade are suppported over considerably greater length than is the center of the blade.

The top surface of the die jaw set 15 adjacent the blade holder assembly 32 is formed to mate with the blade holder. That is, the face adjacent the blade holder has a central section 54 which projects upwardly around the workpiece 20 and toward the blade holder 38. The sections 56 are cut away to receive and mate conjugately with the extended portions 50 and 52 of the blade holder.

Figure 2:
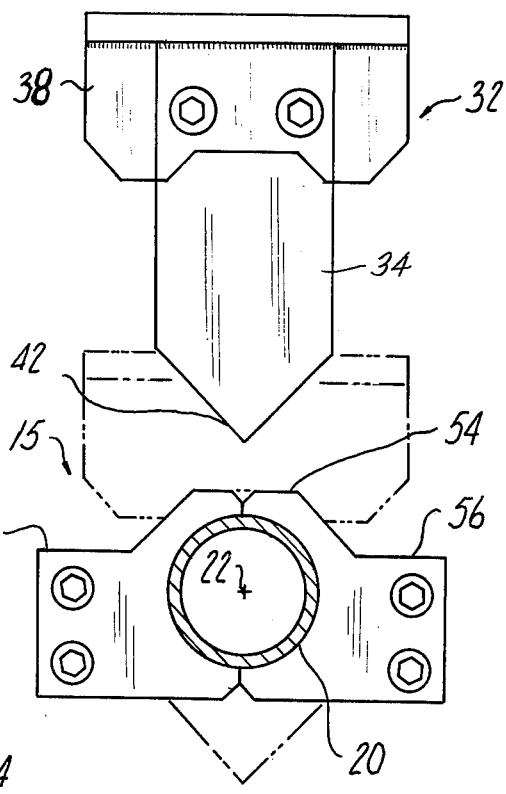
FIG. 2 is a view of the severing knife and the workpiece clamping means broken away from the tube cutoff machine of FIG. 1 to more fully show their cooperation.

When the ram 14 descends on the cutting stroke, as shown by the phantom lines in FIG. 2, the blade holder 38 and jaw set 15 tend to fit together in a mating or conjugate relationship; specifically, the recessed central section of the blade holder 38 mates with the projecting central section 54 of the jaw set 15. The stroke length or penetration depth is increased by the depth of the recess in the center of the blade holder assembly while at the same time lateral support is provided for the blade 34 by the prolonged blade holder sections 50 and 52.

The invention is, of course, not limited to the embodiment illustrated herein, but is generally adaptable to all types of shear cutoff apparatus; e.g., the jaws may be stationary rather than clamping, the cutoff may be of single rather than double cut design and workpieces other than round tubes may be cut. Accordingly, various embodiments of the invention will suggest themselves to those having skill in the art without departing from the scope or essence of the following claims.

The embodiments of the invention in which an exclusive property or privilege is claimed are defind as follows:

1. In a tube cutoff apparatus of the type using a ram-driven shearing blade to sever a clamped workpiece:
   holder means for said blade and comprising a clamping structure, said clamping structure mechanically interconnecting said holder means and blade and defining a pocket having support surfaces for the faces and sides of the blade, said support structure having vertically extending portions enveloping the edges of said blade when in the pocket and bounding a central upwardly recessed portion over which the faces of the blade are exposed;
   workpiece clamping means adapted to receive and hold the workpiece to be severed, and having a central slot for permitting the blade to pass therethrough and through the workpiece;
   the clamping means having a top surface which is matingly conjugate with the holder means
   whereby the blade holder abuts the workpiece clamping means in substantially nesting relationship when the ram is fully driven toward the workpiece.

2. The apparatus as described in claim 1 wherein the workpiece clamping means comprises:
   first and second pairs of jaws,
      each pair of jaws spaced with respect to the other pair along the longitudinal axis of tubular workpiece,
         the space therebetween providing the central slot;
      each pair of jaws including reversely similar bodies disposed on opposed lateral sides of the workpiece, each body having a jaw opening in a face adjacent the workpiece which is adapted to bear against the workpiece.

* * * * *